UNITED STATES PATENT OFFICE.

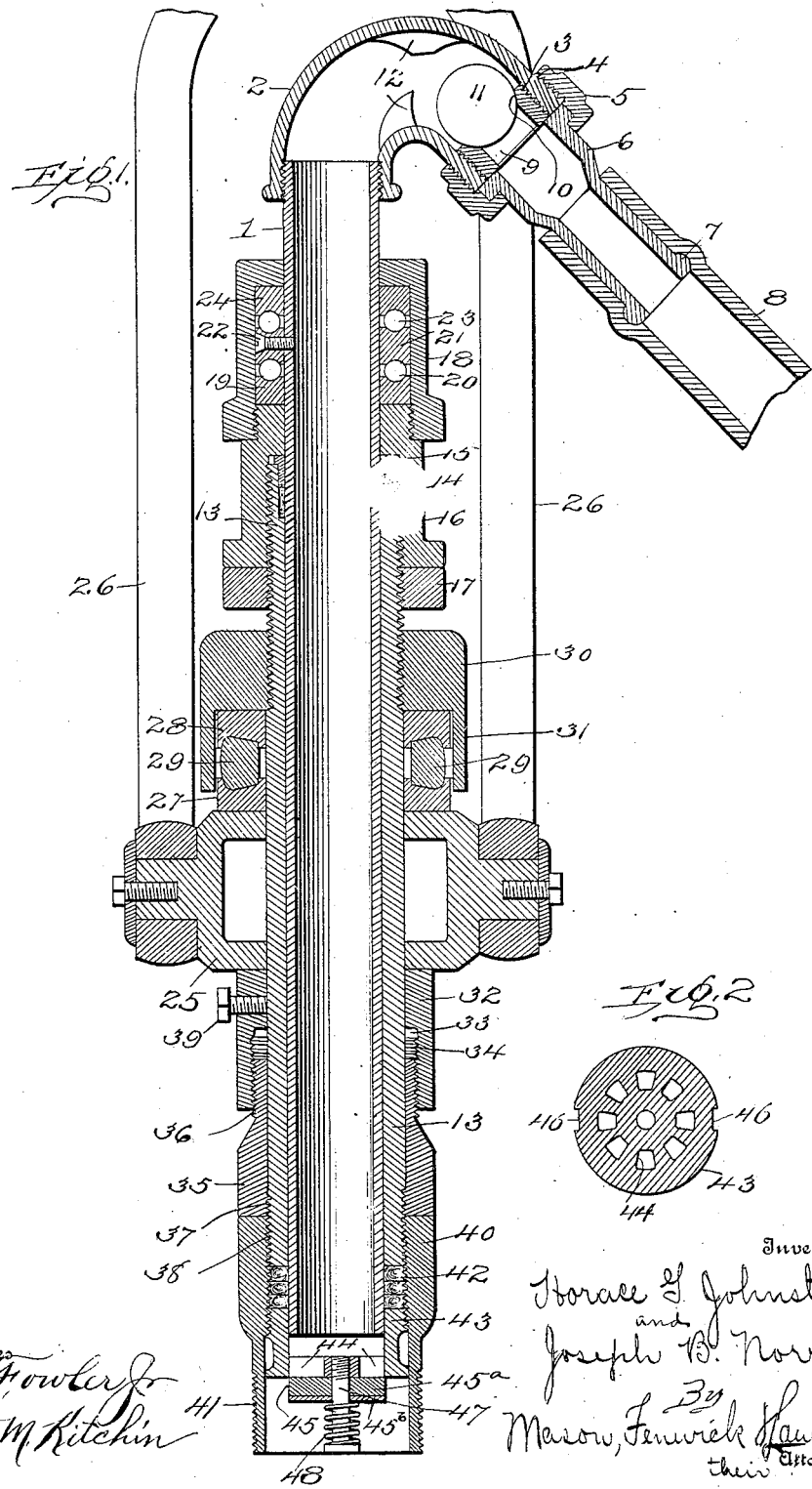

HORACE G. JOHNSTON AND JOSEPH B. NORRIS, OF CORSICANA, TEXAS, ASSIGNORS TO THE AMERICAN WELL & PROSPECTING CO., OF CORSICANA, TEXAS.

HYDRAULIC SWIVEL.

No. 873,669.          Specification of Letters Patent.          Patented Dec. 10, 1907.

Application filed March 2, 1907. Serial No. 360,293.

*To all whom it may concern:*

Be it known that we, HORACE G. JOHNSTON and JOSEPH B. NORRIS, citizens of the United States, residing at Corsicana, in the county of Navarro and State of Texas, have invented certain new and useful Improvements in Hydraulic Swivels; and we do hereby declare the following to be a full, clear, and exact description of the invention, such as will enable others skilled in the art to which it appertains to make and use the same.

This invention relates to improvements in hydraulic swivels, and one of the objects in view is the controlling of back pressure.

Another object in view is the facilitating of the adjustment of parts of the swivel which are subjected to wear and the ready locking of the parts in their respective relations.

With these and further objects in view the invention comprises certain novel constructions, combinations and arrangements of parts as will be hereinafter fully described and claimed.

In the accompanying drawing,—Figure 1 is a longitudinal, vertical, central section taken through a hydraulic swivel embodying the features of the present invention, parts being broken away. Fig. 2 is an enlarged, detail, horizontal section taken through the spider forming the valve seat of the lower check valve.

In the drilling of oil wells it frequently happens that the drill penetrates a gas vein, and when the ordinary hydraulic swivel is being employed the back pressure created by the gas blows the water supply hose off from its connection with the swivel, and in some instances the well is wrecked by the back pressure which is not taken care of. One of the objects of the present invention is to obviate the possibility of this disaster, and another object is to provide means for locking the several moving parts of the swivel with respect to each other in such manner that they will not readily loosen, and yet are capable of ready adjustment.

Referring to the drawing by numerals, 1 indicates a hose stem onto the upper end of which is threaded the usual goose neck fitting 2, which at its free end is threaded internally as indicated at 3 and is also threaded externally as indicated at 4. Engaging the threads 4 is the coupling of a union, the annular sleeve 6 of said union being arranged with an annular outwardly turned flange interlocking with the annular inwardly turned flange of the coupling 5. At the outer end of the sleeve 6 is arranged an annular bead 7, and in practice any suitable hose p pe 8 is forced onto the sleeve 6 for a suitable distance, the bead 7 serving to retain the hose 8 against removal. It is obvious, of course, that any suitable hose clamp may be employed if desired for firmly retaining the hose in position on the sleeve 6. A bushing 9 is threaded into the threads 3 and at its inner end is formed into a valve seat 10, at times adapted to receive a ball valve 11. The fitting 2 is provided with lugs 12, 12, which serve in operation to prevent the ball valve 11 from dropping down into the hose stem 1.

The hose stem 1 extends downwardly through a swivel stem 13, said swivel stem being provided at its upper end with an annular recess 14 supplied with any preferred packing, which packing is designed to be compressed by a gland 15, the upper end of which gland is engaged by the inwardly extending annular flange of a cap 16, which is threaded onto the upper end of the swivel stem 13. The cap 16 is preferably locked in position by a suitable lock nut 17 which is threaded onto the swivel stem below the cap 16. The threading of the cap 16 down upon the gland 15 compresses the packing in the recess 14 and thus produces a tight joint between the swivel stem and the hose stem. An annular cap 18 is threaded onto the upper end of the cap 16 and forms an annular housing about the hose stem 1 closed at its upper end by an inwardly extending annular flange. Mounted on the upper end of the cap 16 within the housing formed by cap 18 is a bearing ring 19 formed with an annular race-way in which are arranged ball or other suitable bearings 20, which bearings support a bearing ring 21. The bearing ring 21 is fixed to the hose stem 1 in any suitable manner so as to revolve therewith. A screw 22 is indicated in the drawing as a securing means for fastening the ring 21 to the hose stem 1, but it is of course obvious that any suitable means of attachment may be provided. The ring 21 is formed with a race-way on its under surface into which the upper portions of the bearings 20 extend, and the said ring is formed with a similar race-way in its upper surface supporting ball or other suitable antifriction bearings 23 upon which rests a bearing ring or collar 24 which is formed with a suitable race-way for receiving the upper portions of the bearings 23. The annular flange at the upper end of the cap 18 preferably fits snugly over the ring 24, and thus the hose stem 1 is sustained in position while permitting the surrounding parts to be freely rotatable about the stem.

A supporting or swivel block 25 surrounds the swivel stem 13 and is engaged by a suitable bail 26, only a fragment of which is indicated, as the said bail and swivel block are not features of novelty in this application, the same having been fully disclosed in the patent to H. G. Johnston, one of the applicants herein, No. 742,667, dated Oct. 27, 1903. Surrounding the swivel stem 13 above the block 25 are bearing rings 27 and 28 spaced apart by any suitable bearings 29 which ride in suitable race-ways formed in said rings. The bearing ring 27 preferably rests upon the upper surface of the block 25, and the bearing ring 28 is engaged by a nut 30 which is threaded upon the upper end of the swivel stem 13 down upon the ring 28 for preventing upward movement thereof independent of the surrounding parts. A depending housing or flange 31 is preferably formed integral with the nut 30 and incloses the ring 28, the bearings 29 and a portion of the ring 27, so as to exclude dust and prevent undesirable lateral play in case of wear prior to readjustment.

The under surface of the trunnion or supporting block 25 is engaged by the upper edge of a sleeve 32 which surrounds the swivel stem 13 and which is formed near its lower end with an annular cut-away portion 33, the sleeve being internally threaded, as at 34, at the point of the cut-away portion 33. The sleeve 32 is preferably provided with a set screw 39, which in operation is preferably threaded into engagement with the outer surface of the swivel stem 13 for positively locking the sleeve 32 against movement. A locking sleeve nut 35 surrounds the swivel stem 13 and is externally threaded at its upper end, as at 36, which external threads engage the internal threads 34, the said sleeve nut being internally threaded at its lower end, as at 37, which internal threads engage the external threads 38 formed at the lower end of the swivel stem 13.

A bushing 40 is internally threaded and threaded onto the threads 37 of the swivel stem 13 up to engagement with the lower edge of the locking sleeve nut 35, the lower end of the bushing 40 being externally threaded as at 41 for the reception of various sizes of bushings connected with the different sizes of well pipes. The bushing 40 extends below the lower end of the swivel stem 13 and the hose stem 1 also preferably extends below the lower end of said swivel stem so that an annular space is left between the bushing 40 and the lower end of the hose stem 1. Below the lower end of the swivel stem 13 and in the said space is preferably placed packing 42 which is retained in place and preferably compressed by a gland 43 threaded into the sleeve 40, the said gland fitting snugly between the lower end of the swivel stem 1 and the sleeve 40. The gland 43 extends below the lower end of the swivel stem 1 and beneath said swivel stem is formed with a spider 44 of any preferred type, so as to form the seat for a valve 45. The gland 43 thus forms a combination gland and valve seat and is preferably provided, as seen in Fig. 2, with notches 46, 46, for the reception of a rotating tool. In practice the combination gland and valve seat 43 is threaded upwardly in the sleeve 40 sufficiently for compressing the packing 42 longitudinally and expanding the same laterally to a sufficient extent for preventing the admission of foreign substances between the hose stem 1 and the swivel stem 13. The valve 45 is of comparatively simple construction and consists preferably of a block or disk of rubber or other suitable material $45^a$ backed preferably by a plate of metal $45^b$, the valve being perforated centrally and a supporting bolt 47 being passed therethrough and threaded into the central portion of the spider 44. A spring 48 is interposed between the head of the bolt 47 and the valve 45 and normally retains the same against the valve seat formed by the spider 44.

In operation it is common to connect the present improved hydraulic swivel to the usual well pipe and supply water through the hose 8, the water passing the valves 11 and 45 by causing the said valves to move back from their seats. It will of course be obvious that if any back pressure occurs the valve 45 will be first thrown to its seat and will resist the admission of pressure to the hose stem 1, but if any pressure should be admitted the valve 11 will be thrown to its seat and will effectually resist the escape of pressure from the swivel and thus effectually protect the hose 8 from being injured or removed.

In assembling the parts of the present improved hydraulic swivel which are arranged below the supporting block 25, the sleeve 32 is first threaded onto the sleeve locking nut 35 and the two are slid longitudinally upwardly on the lower end of the swivel stem 13 until the threads 37 engage the threads 38, and then the two sleeves are passed on up the swivel stem by threading the sleeve lock nut 35 upwardly. The bushing 40 is then threaded onto the lower end of the swivel stem 13 and the sleeve lock nut 35 is next threaded down upon the bushing 40 for firmly pressing it in place for preventing accidental loosening thereof. Next the sleeve 32 is threaded upwardly on the threads 34 and 36 until the upper end of the sleeve 32, engaging the block 25, moves the said block to the desired position with the bearings 29 and their surrounding parts in proper relation. The set screw 39 is then threaded home for locking the sleeve 32 against rotation. It is to be noted that any wear of the bearings 29 or contacting parts may be readily taken up by simply loosening the set screw 39 and threading the sleeve 32 a little farther upward according to the amount of wear to be taken up, and then tightening the set screw 39 again. After the bushing 40 has been locked in place as described, the packing 42 is inserted and the combination gland and valve seat together with the valve carried thereby is threaded up into the bushing 40 for compressing the packing 42 as above described.

In operation the bail 26 is engaged in any preferred manner by a coupling or other supporting means, and when it is desired to add a section of the well pipe, the bushing of the well pipe which engages the threads 41 of the bushing 40 is disconnected from its bushing 40 and the entire hydraulic swivel is elevated through the medium engaging the bail 26. Thus the said bail and connected parts constitute a support for the swivel stem when the swivel stem is disconnected and when the swivel stem is connected to the well pipe the supporting block 25 and connected parts are sustained by the sleeve 32.

What we claim is,—

1. In a hydraulic swivel, the combination, with a swivel stem and a hose stem discharging therethrough, of a check valve disposed contiguous to, and in axial alinement with the swivel stem and adapted to prevent the admission of back pressure to the hose stem.

2. In hydraulic swivel, the combination, with a swivel stem and a hose stem discharging therethrough and having a stuffing box disposed for preventing admission of fluid between the hose and swivel stem, of a packing gland for said stuffing box formed with a valve seat, and a check valve adapted to engage said seat for preventing the admission of back pressure to a hose stem.

3. In a hydraulic swivel, the combination, with a swivel stem and hose stem discharging therethrough, of a check valve at one end of the hose stem for preventing the admission of back pressure thereto, and a check valve at the outside end of the hose stem for preventing the escape of back pressure through the hose stem.

4. In hydraulic swivel, the combination, with a swivel stem and a hose stem discharging therethrough, of a goose-neck fitting connected with the upper end of the hose stem and provided near its outer end with a removable valve seat and a stop spaced inwardly from said seat, and a valve disposed between said seat and stop and adapted to engage the seat for preventing the escape of back pressure through the hose stem.

5. In a hydraulic swivel, the combination with a threaded swivel stem and a hose stem revolubly connected therewith, of a supporting block for said swivel stem, means for revolubly supporting said swivel stem upon said block, sleeves threaded together and surrounding said swivel stem, the lower one of said sleeves being formed with threads engaging the threads of the swivel stem, and the upper one of said sleeves contacting with said supporting block, and a third sleeve threaded on to the swivel stem into contact with the lower one of the first mentioned sleeves for preventing displacement thereof.

6. In a hydraulic swivel, the combination with a swivel stem and a hose stem discharging therethrough, of a fitting arranged at the upper end of said hose stem, a bushing threaded into the end of said fitting and formed at its end into a valve seat, a ball valve disposed within said fitting, means for limiting the movement of said valve away from said seat, and means for supplying water to the free end of said fitting.

7. In a hydraulic swivel, the combination with a threaded swivel stem and a hose stem revolubly connected therewith, of a supporting block for said swivel stem, means for revolubly supporting said swivel stem upon said block, sleeves threaded together and surrounding said swivel stem, one of said sleeves being formed with threads adapted to engage the threads of the swivel stem, and the other of said sleeves being adapted to engage said supporting block.

8. In a hydraulic swivel, the combination with a threaded swivel stem and a hose stem therefor, of a supporting block for said swivel stem, and means revolubly supporting the swivel stem thereon, sleeves threaded together and surrounding the swivel stem, one of the sleeves being formed with threads engaging the threads of the swivel stem and the other of the sleeves being adapted to engage the supporting block, and a set screw carried by the second mentioned sleeve in position for engaging the swivel stem.

9. In a hydraulic swivel, the combination with a swivel stem threaded at its lower end and a hose stem for said swivel stem, of a supporting block for sustaining said swivel stem, means for revolubly sustaining said swivel stem on said supporting block, a pair of sleeves threaded together, one of said sleeves being threaded onto the lower end of the swivel stem, and a bushing threaded onto the lower end of the swivel stem and adapted to be engaged by one of said sleeves for being locked in position, the other of said sleeves being adapted to engage the supporting block for sustaining the same in position.

10. In a hydraulic swivel, the combination with a swivel stem and a hose stem therefor, of a bushing threaded onto the lower end of said swivel stem, a valve seat threaded into said bushing and a check valve for said seat adapted to be thrown to said valve seat by back pressure.

11. In a hydraulic swivel, the combination with a swivel stem and a hose stem therefor, of a bushing threaded onto the lower end of said swivel stem, a valve seat threaded into said bushing and formed with a spider, and an upwardly acting check valve carried by the spider beneath the same.

12. In a hydraulic swivel, the combination with a swivel stem and a hose stem therefor, of a bushing threaded onto the lower end of said swivel stem, a locking sleeve nut threaded onto the swivel stem above the bushing and threaded down upon the bushing for locking the same in position, a sleeve threaded onto the said locking sleeve nut, a set screw carried by said last mentioned sleeve in position for engaging the swivel stem, a supporting block sustained in position by said last mentioned sleeve, and means for revolubly supporting said swivel stem upon said supporting block.

13. In a hydraulic swivel, the combination with a swivel stem and a hose stem discharging therethrough, of a bushing threaded onto the lower end of said swivel stem, a valve seat threaded into said bushing and extending below the hose stem, and a check valve sustained by said valve seat.

14. In a hydraulic swivel, the combination with a swivel stem and a hose stem therefor, of a bushing threaded onto the lower end of said swivel stem, a valve seat threaded into said bushing and formed with a spider, a bolt threaded into the spider and formed with a head, a valve surrounding the bolt, and a spring interposed between the bolt and the bolt head for normally retaining the valve on said seat.

15. In a hydraulic swivel, the combination with a swivel stem and a hose stem extending below the same, of a bushing threaded into the lower end of the swivel stem and extending below the swivel stem producing an annular inclosed space between itself and the hose stem, and beneath the lower end of the swivel stem, a combination gland and valve seat threaded onto said bushing and fitting about the lower end of the hose stem, packing interposed between the said gland and the lower end of the swivel stem, and a valve coöperating with said valve seat for preventing the admission of back pressure to the hose stem.

In testimony whereof we affix our signatures in presence of two witnesses.

HORACE G. JOHNSTON.
JOSEPH B. NORRIS.

Witnesses to signature of Horace G. Johnston:
    I. N. JOHNSTON,
    J. H. JOHNSTON.

Witnesses to signature of Joseph B. Norris:
    DON HAGHER.
    W. J. HALL.